United States Patent [19]

Baresel et al.

[11] Patent Number: 4,944,273
[45] Date of Patent: Jul. 31, 1990

[54] ZEOLITES AS SPECIFIC ADSORBENTS FOR $NO_X$ AND CO

[75] Inventors: Detlef Baresel, Stuttgart; Peter Scharner, Leonberg Gebersheim, both of Fed. Rep. of Germany

[73] Assignee: Robert Bosch GmbH, Stuttgart, Fed. Rep. of Germany

[21] Appl. No.: 313,621

[22] Filed: Feb. 21, 1989

[30] Foreign Application Priority Data

Feb. 24, 1988 [DE] Fed. Rep. of Germany ....... 3805734

[51] Int. Cl.$^5$ ................... F02D 41/14; G01N 27/417
[52] U.S. Cl. .................................. 123/440; 73/31.06; 204/424; 123/489
[58] Field of Search .................... 123/440, 489; 73/23, 73/27 R; 204/424

[56] References Cited

U.S. PATENT DOCUMENTS

| | | |
|---|---|---|
| 3,702,886 | 11/1972 | Argauer et al. |
| 3,999,122 | 12/1976 | Winstel et al. ................. 73/27 R X |
| 4,250,345 | 2/1981 | Chu. |
| 4,347,732 | 9/1982 | Leary .................................. 73/23 |
| 4,453,151 | 6/1984 | Leary et al. ........................ 73/23 X |
| 4,703,646 | 11/1987 | Muller et al. ..................... 73/23 |
| 4,759,210 | 7/1988 | Wohltjen ............................ 73/23 |

FOREIGN PATENT DOCUMENTS 1334243 10/1973 United Kingdom.

*Primary Examiner*—Tony M. Argenbright
*Attorney, Agent, or Firm*—Frishauf, Holtz, Goodman & Woodward

[57] ABSTRACT

The use of zeolites rich in silicic acids having an Si:Al ratio of 1:1 to 100:1 as specific adsorbents for $NO_X$ or CO is proposed. Because of their property of specifically adsorbing $NO_X$ or CO, these zeolites, in particular those zeolites doped with such metals as Ca, Co, Ni, Fe, Cu, Ag, Pt or Ru, and having the above mentioned ratio of Si to Al, are especially suitable for the production of specific $NO_X$ or CO sensors based on semiconductors. Such sensors can be used as sensors for exhaust gases of automotive vehicles, for example.

18 Claims, 1 Drawing Sheet

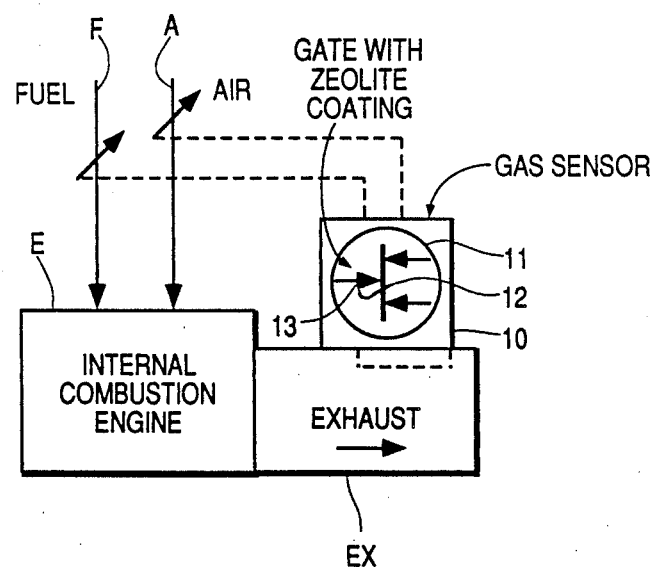

ZEOLITES AS SPECIFIC ADSORBENTS FOR $NO_X$ AND CO

BACKGROUND

As is generally known, zeolites are understood to be a group of naturally occurring silicate minerals, which can also be synthetically produced mainly from sodium silicate, sodium aluminate and sodium hydroxide, which are used to a large extent in industry. A common characteristic of the crystalline structures is a three-dimensional network or matrix made of $SiO_4$ and $AlO_4$ tetrahedrons permeated with channels and voids. Excess negative charge loading of the matrix is compensated for by cations, e.g. Na and Ca ions. These ions can be exchanged for other ions. It is known that the suitability of zeolites as an ion exchanger is based on this. Dehydrated zeolites will absorb water in contact with surroundings containing water vapor and therefore can be used as desiccants. It is also possible to retain other, relatively small molecules, such as ammonia, hydrogen sulfide and carbon disulfide, in the voids, separating them in this way from other materials. Based on this property, zeolites can be used as so-called molecular sieves or filters.

Because of their catalytic properties, it is further known to use synthetic zeolites, in particular zeolites loaded with trivalent cations, as catalysts in the petroleum-processing industry. Methods for producing crystalline zeolites, loaded with different cations and usable as catalysts, are known, for instance from U.S. Pat. Nos. 3,702,886 and 4,250,345, British Pat. No. 1 334 243 and many other patents.

THE INVENTION

It has been surprisingly found that zeolites having an Si:Al ratio of 1:1 to 100:1, preferably 2:1 to 60:1, can also very well be used as specific adsorbents for nitrogen oxides ($NO_x$) or CO. Depending on the cations present in the network of the zeolites, zeolites with the Si:Al ratio mentioned can be used as specific adsorbents for either nitrogen oxides or carbon monoxide. Because of these properties it is possible, for example, to use such zeolites for producing specific $NO_x$ or CO sensors based on semiconductors which can for instance be used as a specific $NO_x$ or CO sensor for exhaust gases of automotive vehicles or other exhaust gases, because zeolites are stable at temperatures up to approximately 700° C. If the gate of a field effect transistor (FET) is coated with a zeolite which specifically adsorbs $NO_x$ or CO, the current flowing through the Si semiconductor element is influenced by the adsorbents, i.e., adsorbed $NO_x$ or CO, acting on the gate, so that these gases can be separately registered. Because the amount of $NO_x$ is in a direct correlation to the amount of fuel used at the optimum ignition setting, it is also possible to regulate, i.e., minimize, the soot emission by means of this setting.

Zeolites usable in accordance with the invention can be produced according to the usual known methods and processes, such as described in detail e.g. in U.S. Pat. Nos. 3,702,886 and 4,250,345 and in British Pat. No. 1 334 243 and in the patents cited in these patents. This means that according to the invention, synthetic, crystalline zeolites that in accordance with the specification of the mentioned patents can be used as catalysts in the petroleum-processing industry and are also available in the trade can for instance be used as specific adsorbents for $NO_x$ and CO.

The use of those zeolites which are doped with transition metal cations, such as Fe, Co, Ni, Ru and Pt, has proven to be particularly advantageous. However, other zeolites are also usable in accordance with the invention, for example those which are doped with Cu or Ag or alkaline earths, such as Ca.

For use as specific adsorbers of carbon monoxide and nitrogen oxides, zeolites preferably containing the doping metals at concentrations of 0.01 to 10.0 mol %, and more preferably 0.5 to 5.0 mol %.

The zeolites which have been doped with e.g. Ca, Co, Ni, Fe, Cu, Ag, Pt or Ru or other cations can be produced in a simple way from the corresponding "H forms" of the zeolites. This is done in an advantageous way by slurrying the "H form" of the zeolite in the solution of a salt of the doping ion, for example in a solution of cobalt nitrate, ferric nitrate, hexamino-cobalt chloride, tetramino-platinum chloride or ruthenium chloride, by filtering, washing, drying and then calcining at temperatures on the order of 400° to 500° C. over a period of one to three hours.

It was shown that a direct exchange with Na forms is possible in only a few cases, because slurries of these zeolites in water have pH values of 9 to 12 and lead to hydrolysis and the precipitation of the cations to be introduced, such as transition metal cations.

DRAWING

The single FIGURE is a schematic representation of an internal combustion engine with the gas sensor in accordance with the invention, forming part of the exhaust gas sensing system.

DETAILED DESCRIPTION

The gas sensor 10 is responsive to exhaust gases from an exhaust EX coupled to an internal combustion engine E. The exhaust sensor 10, via suitable control systems, controls the relative emission of fuel and air to the internal combustion engine E, as schematically indicated by the broken lines from sensor 10 to the control arrows in lines A (air) and F (fuel). The fuel-air ratio, thus, can be determined by the reference to the exhaust gas sensor.

The exhaust gas sensor 10 is a semiconductor and, more preferably, a field transistor (FET) 11 which has a gate terminal 13 coated with zeolite coating 12.

Method of preparing zeolites 12 for coating the gate 13 of FET 11:

Gels of NaOH, $NaAlO_2$, microdispersed silicic acid and tetraalkylammonium hydroxide, e.g. tetraethylammonium hydroxide, tetrapropylammonium hydroxide or tetrabutylammonium hydroxide, in water are prepared, which are maintained in Teflon-lined (polytetrafluoroethylene) or other similar inert material coated autoclaves, for six to twelve days at 140° to 190° C. The Si:Al ratio should be maintained in the 1:1 to 100:1 and preferably 2:1 to 60:1 range. To achieve a practical crystallization, defined molar conditions of the basic components as well as temperature and time must be closely maintained.

During heating in the autoclave, the amorphous gels crystallize into micro-crystalline products which are filtered and are freed of dissolved, non-reacted products by washing in water. Then they are dried and are heated to approximately 500° C. to remove the water bound to the interior of the zeolites. For an $NH_4$ exchange, the zeolites are slurried three to six times with a 2-molar NH$_4$Cl solution at 20° to 90° C. and left standing for a time. After filtering they are washed to remove Cl ions, dried and heated to 520° C. for three hours. The "H forms" of the zeolites thus obtained are used for exchange for transition metal ions, such as Fe, Co, Ru and Pt. Exchange takes place in the same manner as the NH$_4$ exchange by slurrying in a salt solution, e.g. in a solution of cobalt nitrate, ferric nitrate, hexaminocobalt chloride, tetramino-platinum chloride or ruthenium chloride, by filtering, washing, drying and then calcining at 400° to 500° C.

Direct exchange with the originally obtained Na forms is possible in only a few cases, because slurries of these zeolites in water have pH values of 9 to 12 and lead to hydrolysis and the precipitation of the cations to be introduced.

The "H forms" of zeolites which can be used as the base materials for the production of zeolites used in accordance with the invention are available commercially. Also available commercially are zeolites which are already doped. An example of this is the zeolite type 5A, available in the trade and having the total formula:

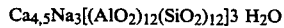

$Ca_{4.5}Na_3[(AlO_2)_{12}(SiO_2)_{12}]3\ H_2O$

Whether a zeolite is suitable as a NO$_x$ or CO adsorbent can be determined in the manner described below:

The adsorption and desorption of CO and NO by the zeolites can be determined by the dynamic method in flowing helium having a constant flow speed by metering a set amount of CO or NO (as a diluted mixture of 20% by volume of NO and 80% by volume of He) into the inert gas flow by means of a gas sample inlet element. The changes in the heat conductivity of the gas caused by desorption can be measured by means of a heat conductivity detector. Through calibration with known amounts of CO and NO, the absorbed amount can be quantitatively measured.

In the above case, the zeolite samples were baked at 420° to 450° C. before the CO or NO was passed over them. Their interior surfaces were determined by the B.E.T. method.

DESCRIPTION OF THE EXEMPLARY EMBODIMENT

EXAMPLE 1

1.0 g of aluminum chips were dissolved in a solution of 3.6 g sodium hydroxide in 10 ml water. Then 12.4 g of SiO$_2$ (microdispersed silicic acid) were suspended in a (40%) solution of 67.5 g of tetraethylammonium hydroxide in 100 ml water and combined while stirring with the aluminate solution. The gel obtained was stirred for one hour at 20° C. and then maintained for six days in an autoclave lined with Teflon (duPont brand name for polytetrafluoroethylene) at 152° C. The reaction product was washed with plenty of water, dried and then heated for two hours to a temperature of 540° C.

An exchange of the Na ions was performed three times with a 1 molar NH$_4$Cl solution (left standing in the NH$_4$Cl solution for approximately 10 hours per exchange); then filtering, drying at 120° C. for an hour and baking at 540° C. for two hours was performed. A zeolite of the ZSM5 type with the H form was obtained.

The ZSM5 H zeolite was transformed into the cobalt form by slurrying 1.5 g of the zeolite with 200 mg of cobalt acetate in 30 ml of water, dissolving the cobalt salt by heating and then heating the combined solution to boiling. The cooled solution was left standing overnight. The next day it was washed with water, filtered, dried and baked as described above. A zeolite of type ZSM5, doped with Co, was obtained in this manner.

EXAMPLE 2

15 g of a commercially available zeolite 13X in H form (Union Carbide) of the composition [Na$_{86}$(AlO$_2$)$_{86}$(SiO$_2$)$_{106}$]x H$_2$O were suspended in 200 ml of a 2 m NH$_4$Cl solution, left standing for one hour, filtered and washed free of chloride. This process was repeated twice. Then drying for one hour at 150° C. and baking at 520° C. for two hours was performed (Zeolite 13X in H form).

1.5 g of the zeolite 13X (H form) obtained were suspended or dissolved in water with 200 mg RuCl$_3$ and heated to boiling (pH approximately 5). The black precipitate was acidified with diluted hydrochloric acid (pH approximately 2) and heated again. The remaining black precipitate was dried, washed in water and then in acetone, dried at 150° C. and baked at 500° C. for two hours. A zeolite of the type 13X, doped with Ru, was obtained in this manner.

EXAMPLE 3

4.1 g of NaAlO$_2$, obtained from 2.60 g of Na$_2$CO$_3$ and 2.55 g of Al$_2$O$_3$ sintering between 700° C. and 1,150° C., were dissolved 20 ml of water. 1.0 g of NaOH was dissolved in 80 ml of water and 18 g of microdispersed silicic acid (SiO$_2$) were suspended therein. Both mixtures were combined and maintained for six days in an autoclave at 150° C. They were then filtered, washed with water, dried for one hour at 200° C. and left standing for three periods of 12 hours each in 200 ml of a 2 m NH$_4$Cl solution. After drying for two hours at 200° C. and baking for two hours at 520° C., a zeolite A in the H form (inactive) was obtained.

1.34 g of the NaAlO$_2$, prepared as described above, were dissolved at 100° C. in 15 ml of a solution of (40%) tetraethylammonium hydroxide. Furthermore, 25 g of microdispersed SiO$_2$ were suspended in 70 ml water and combined with the above solution. The mixture was heated to 178° C. for seven days in an autoclave. It was then slurried in water, washed, dried at 120° C. and baked for two hours at 520° C. A zeolite of the type ZSM8, doped with Na, was obtained in this manner.

EXAMPLE 4

0.8 g of NaAlO$_2$ were slurried in a mixture of 50 ml water and 32 g of (20%) tetrabutylammonium hydroxide solution and partially dissolved. 30 g of SiO$_2$ were added to this mixture while stirring and the mixture was diluted with water to 100 ml. This mixture was heated in an autoclave to 150° to 170° C. for 10 days.

The reaction product was washed with water, dried and baked one hour at 540° C. The NH$_4$ exchange was performed three times with a 1 m NH$_4$Cl solution with subsequent filtration, drying at 120° C. and baking for 2 hours at 540° C. (ZSM8).

The Ru exchange was performed with [Ru NOCl$_3$(H$_2$O)$_2$.]3 H$_2$O by slurrying 2 g of the zeolite ZSM8 in 20 ml of a watery solution with 100 mg of the Ru compound and keeping it at a boil for one hour. Filtration, drying at 150° C. and heating to 400° C. for one hour followed.

The adsorption properties of these zeolites are shown in the table below.

TABLE

| | | Adsorption of CO or NO by Zeolites | | | |
|---|---|---|---|---|---|
| No. | Type | $SiO_2:AlO_2$ (Set ratio) | CO Adsorbed [$m^2/g$] | NO adsorbed [$m^2/g$] | BET surface area [$m^2/g$] |
| 1 | ZSM5 with Co | 3:1 | 0 | 3.8 | 45,9 |
| 2 | 13 × with Ru | 1.2:1 | 3.1 | 0 | 316,2 |
| 3 | ZSM8 with Na | 25:1 | 32.3 | 0 | 263,9 |
| 4 | ZSM8 with Ru | 56:1 | 0 | 1.5 | 454,6 |

Corresponding results in connection with the specific NO adsorption are obtained with the use of the 5A zeolites of Union Carbide together with Ca, with the ZSM11 and ZSM8 zeolites together with Co, Fe, Cu, Ag, Ru or Pt, as well as for the specific adsorption of CO with the 13x zeolite together with Co.

What is claimed is:

1. A method of selectively adsorbing a nitrogen oxide or carbon monoxide from a gas containing nitrogen oxide or carbon monoxide comprising contacting said gas with a zeolite rich in silicic acid with an Si:Al ratio of 1:1 to 100:1, and which is a specific adsorbent for the nitrogen oxide or the carbon monoxide.

2. The method of claim 1, wherein said zeolite is doped with an effective amount of doping metal selected from the group consisting of Na, Ca, Co, Ni, Fe, Cu, Ag, Pt an Ru to render said zeolite a specific adsorbent for the nitrogen oxide or carbon monoxide.

3. The method of claim 2, wherein the effective amount is 0.01 to 10 mole % of doping metals.

4. The method of claim 3, wherein the doping metal is Ca, Ag or Cu.

5. The method of claim 4, wherein the doping metal is Co, Ni, Fe, Pt or Ru.

6. The method of claim 1, wherein said zeolite is doped with an effective amount of a doping metal selected from the group consisting of transfer metal cations, to render said zeolite a specific adsorber for the nitrogen oxide or carbon monoxide.

7. The method of claim 6, wherein the effective amount is 0.01 to 10 mole % of doping.

8. A sensor specific for a nitrogen oxide or carbon monoxide comprising a semiconductor having a control element; and a zeolite rich in silicic acid with an Si:Al ratio of 1:1 to 100:1, and which is a specific adsorbent for the nitrogen oxide or the carbon monoxide coated on said control element to influence the electrical characteristics of said semiconductor in proportion to the amount of the nitrogen oxide or carbon monoxide adsorbed by said zeolite.

9. The sensor of claim 8, wherein said semiconductor is an FET transistor and said zeolite is coated on its gate.

10. The sensor of claim 9, wherein said zeolite is doped with an effective amount of a doping metal selected from the group consisting of Na, Ca, Co, Ni, Fe, Cu, Ag, Pt and Ru to render said zeolite a specific adsorber for the nitrogen oxide or carbon monoxide.

11. The sensor of claim 10, wherein the effective amount is 0.01 to 10 mole % of doping metals.

12. The sensor of claim 11, wherein the doping metal is Ca, Ag or Cu.

13. The sensor of claim 11, wherein the doping metal is Ni, Fe, Pt or Ru.

14. The sensor of claim 9, wherein said zeolite is doped with an effective amount of a doping metal selected from the group consisting of transfer metal cations to render said zeolite a specific adsorber for the nitrogen oxide or carbon monoxide.

15. The sensor of claim 14, wherein the effective amount is 0.01 to 10 mole % of doping.

16. In an internal combustion engine fuel supply control means of the type having a sensor means to generate a signal in proportion to levels of nitrogen oxides or carbon monoxide in exhaust gases from said engine and being operable to control the fuel/air ratio being introduced into the engine for combustion, the improvement wherein said sensor means comprises a sensor specific for a nitrogen oxide or carbon monoxide comprising a semiconductor having a control element; and a zeolite rich in silicic acid with an Si:Al ratio of 1:1 to 100:1, and which is a specific adsorbent for the nitrogen oxide or the carbon monoxide coated on said control element to influence the electrical characteristics of said semiconductor in proportion to the amount of the nitrogen oxide or carbon monoxide adsorbed by said zeolite and wherein said semiconductor is an FET transistor and said zeolite is coated on its gate.

17. In an internal combustion engine fuel supply control means of the type having a sensor means to generate a signal in proportion to levels of nitrogen oxides or carbon monoxide in exhaust gases from said engine and being operable to control the fuel/air ratio being introduced into the engine for combustion, the improvement wherein said sensor means comprises a sensor specific for a nitrogen oxide or carbon monoxide comprising a semiconductor having a control element; and a zeolite rich in silicic acid with an Si:Al ratio of 1:1 to 100:1, and which is a specific adsorbent for the nitrogen oxide or the carbon monoxide coated on said control element to influence the electrical characteristics of said semiconductor in proportion to the amount of the nitrogen oxide or carbon monoxide adsorbed by said zeolite, and wherein said semiconductor is an FET transistor and said zeolite is coated on its gate; and said zeolite is doped with an effective amount in the range of 0.01 to 10 mole % of a doping metal selected from the group consisting of Na, Ca, Co, Ni, Fe, Cu, Ag, Pt and Ru to render said zeolite a specific adsorber for the nitrogen oxide or carbon monoxide.

18. In an internal combustion engine fuel supply control means of the type having a sensor means to generate a signal in proportion to levels of nitrogen oxides or carbon monoxide in exhaust gases from said engine and being operable to control the fuel/air ratio being introduced into the engine for combustion, the improvement wherein said sensor means comprises a sensor specific for a nitrogen oxide or carbon monoxide comprising a semiconductor having a control element; and a zeolite rich in silicic acid with an Si:Al ratio of 1:1 to 100:1, and which is a specific adsorbent for the nitrogen oxide or the carbon monoxide coated on said control element to influence the electrical characteristics of said semiconductor in proportion to the amount of the nitrogen oxide or carbon monoxide adsorbed by said zeolite and wherein said semiconductor is a field effect (FET) transistor and said zeolite is coated on its gate; and said zeolite is doped with an effective amount of a doping metal selected from the group consisting of transfer metal cations to render said zeolite a specific adsorber for the nitrogen or carbon monoxide.

* * * * *